(12) United States Patent
Higgins

(10) Patent No.: US 6,445,177 B1
(45) Date of Patent: Sep. 3, 2002

(54) CHIP-DETECTOR ASSEMBLY HAVING IMPROVED PROBE-RETENTION FEATURES

(75) Inventor: Paul D. Higgins, Glen Mills, PA (US)

(73) Assignee: Vibro-Meter S.A. (CH)

( * ) Notice: Subject to any disclaimer, the term of this patent is extended or adjusted under 35 U.S.C. 154(b) by 0 days.

(21) Appl. No.: 09/442,011

(22) Filed: Nov. 17, 1999

(51) Int. Cl.[7] .................. G01N 27/74; G01R 33/12; F16B 31/00
(52) U.S. Cl. .................. 324/204; 73/61.42; 340/631; 411/7
(58) Field of Search .................. 324/204; 73/10, 73/61.42, 53.05; 340/631; 81/472–475; 411/1, 6, 7; 439/332–335

(56) References Cited

U.S. PATENT DOCUMENTS

| 3,425,314 A | * | 2/1969 | Ohlson |
| 4,100,491 A | * | 7/1978 | Newman, Jr. et al. ...... 324/204 |
| 4,687,392 A | * | 8/1987 | Bidwell |
| 4,831,362 A | * | 5/1989 | Tsaprazis ................ 324/204 X |
| 5,083,819 A | | 1/1992 | Bynum ........................ 285/89 |
| 5,334,932 A | * | 8/1994 | Nielsen ........................ 324/204 |
| 5,349,849 A | * | 9/1994 | Herron .................. 73/61.42 X |
| 5,349,850 A | * | 9/1994 | Young |
| 5,362,110 A | | 11/1994 | Bynum ........................ 285/87 |
| 5,586,790 A | | 12/1996 | Bynum ........................ 285/89 |
| 5,782,141 A | | 7/1998 | Schoolcraft .................. 74/606 |
| 5,877,690 A | | 3/1999 | Tally ........................... 340/631 |
| 6,297,741 B1 | * | 10/2001 | Higgins ...................... 340/631 |
| 6,309,154 B1 | * | 10/2001 | Higgins |

FOREIGN PATENT DOCUMENTS

WO        WO 00/66937        11/2000

* cited by examiner

Primary Examiner—Gerard R. Strecker
(74) Attorney, Agent, or Firm—Woodcock Washburn LLP

(57) ABSTRACT

A chip-detector assembly has a housing and a probe. The probe is adapted to be coupled to the housing. The chip-detector assembly also includes a locking mechanism comprising a locking ring and a sleeve member. The locking ring is fixedly coupled the housing, and includes a plurality of elongated tangs arranged circumferentially around the ring. The sleeve member is fixedly coupled to the probe, and includes a plurality of contact surfaces that form an outer circumference of the sleeve member. The tangs engage the sleeve-member contact surfaces when the probe is coupled to the housing. The engagement of the tangs and the contact surfaces inhibits the probe from disengaging from the housing once the probe and the housing are coupled.

28 Claims, 8 Drawing Sheets

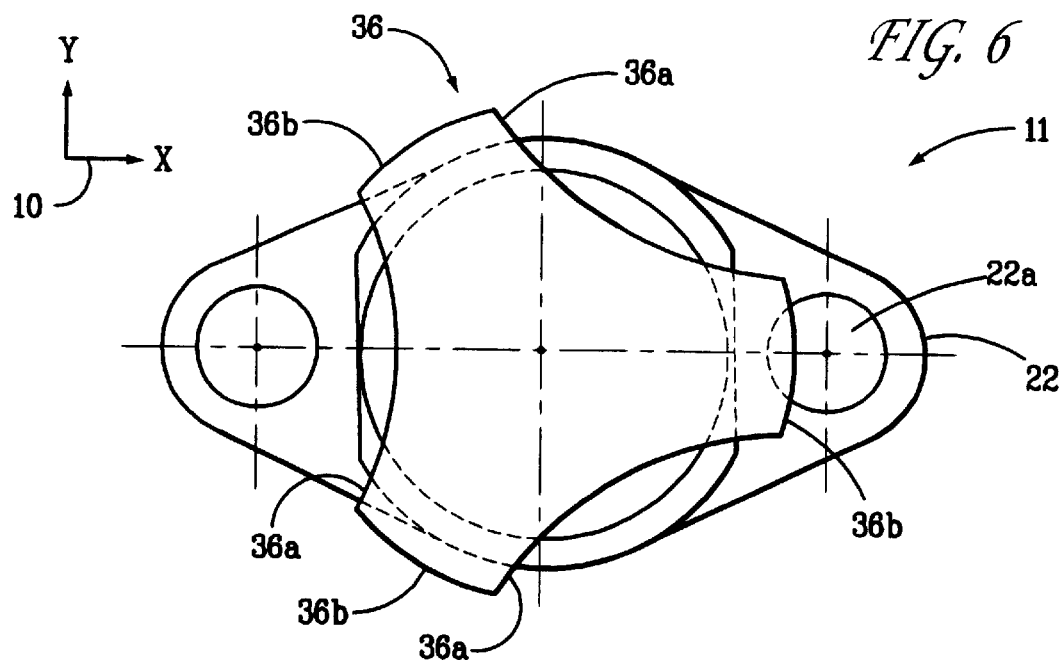
FIG. 6
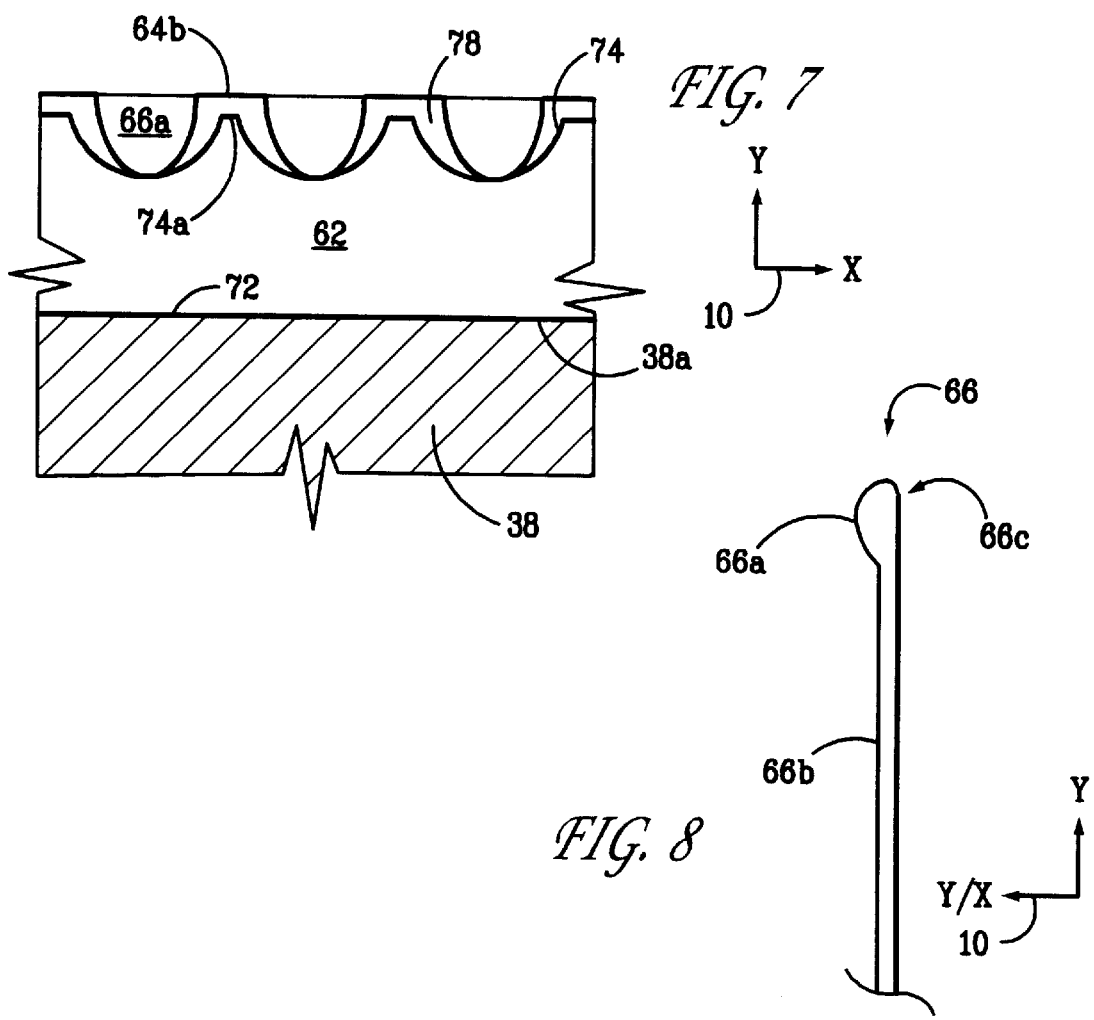
FIG. 7
FIG. 8

CHIP-DETECTOR ASSEMBLY HAVING IMPROVED PROBE-RETENTION FEATURES

FIELD OF THE INVENTION

The present invention relates generally to magnetic chip detectors that detect the presence of wear debris in a stream of lubricant. More particularly, the invention relates to a mechanism for retaining a removable probe within a housing of the chip detector.

BACKGROUND OF THE INVENTION

Bearing and gear failures in gas turbine engines, helicopter gear boxes, and many other types of oil-wetted machinery are typically preceded by the production of wear-related debris. Wear debris is usually produced well in advance of a catastrophic failure of a defective component. Wear debris is typically carried by the machine's lubricating oil toward a sump or a filter within the machine. The debris can be intercepted and collected by a chip detector as it is being transported in this manner. Periodic inspection of the chip detector can thus provide an indication of an impending component failure.

Magnetic plugs (also referred to as "chip collectors") and electric chip detectors are the most commonly used types of chip detectors. Chip collectors comprise a probe having a magnetic element. The probe is typically mounted within some type of housing that is securely fixed to a host component, i.e., a component or machine in which the chip detector is utilized. The probe is periodically removed from the host component so that the magnetic element can be inspected for any accumulation of wear debris.

Electric chip detectors also collect wear debris. In addition, electric chip detectors provide an external, electrically-generated indication of the presence of such debris. Electric chip detectors do not require inspection at pre-determined intervals. These types of chip detectors are usually removed and inspected whenever an external signal (a so-called "chip light") has been activated.

The periodic inspection of chip detectors can present operational drawbacks. For example, many type of machines and mechanical systems utilize multiple chip detectors to identify the location of an incipient component failure. The use of multiple chip detectors allows a defective component or module within the machine or system to be replaced (as opposed to replacing the entire machine or system). The regular inspection of multiple chip-detectors, however, can be a time-consuming maintenance requirement if the chip-detector probes are not specifically designed for quick removal and reinstallation. Furthermore, maintenance personnel must often inspect chip detectors outside, under adverse weather conditions, and within strict time constraints. For example, chip detectors on the engines of commercial airliners must often be inspected during limited turnaround times between flights, while the aircraft is parked on an outdoor ramp.

Thus, chip detectors are often equipped with some type of quick-disconnect mechanism that secures the probe to the housing of the chip detector. Quick-disconnect mechanisms secure the probe in a manner that facilitates removal and reinstallation of the probe with a minimal expenditure of time and labor. Quick-disconnect mechanisms usually comprise a plurality of retaining pins or blades disposed on a surface of the probe. The pins or blades engage corresponding grooves or slots formed in the housing.

Common quick-disconnect mechanisms have a number of substantial disadvantages. For example, quick-disconnect mechanisms are susceptible to excessive wear. This problem stems from the relatively small size of the retaining pins and blades. Specifically, the limited surface area of the pins and blades concentrates the probe-retention forces. This concentration, combined with the vibration normally generated by most machinery, typically produces substantial wear of the pins and the blades. Such wear can eventually cause the pins or the blades to fail. Pin and blade failures can lead to an ejection of the probe, and an ensuing loss of lubricating oil. Ejections of chip-detector probes in this manner on aircraft engines have been known to cause costly and potentially dangerous service disruptions, e.g., in-flight engine shutdowns.

Furthermore, the use of retaining pins or blades complicates the manufacturing process for the probe. Also, pins and blades are usually not visible once the probe has been inserted in the housing. Hence, the probe installer does not receive a positive visual indication that the probe has been properly installed.

Alternatively, the probe and the housing can be coupled using threads. Coupling the probe and the housing in this manner alleviates the wear-related problems associated with quick-disconnect locking mechanisms. Specifically, the use of threads substantially reduces relative movement between the contact surfaces on the probe and the housing, and thereby reduces the wear produced by such movement.

Threaded probes present substantial operational disadvantages. In particular, threaded probes must typically be secured in place through the use of lock wire. Lock wire must be removed and installed manually, each time the probe is inspected. The removal and installation of lock wire requires a substantial expenditure of time and labor. Furthermore, lock wire can be installed improperly and, in extreme cases, a probe may inadvertently be reinstalled without any lock wire whatsoever. The need to perform probe inspections within strict time constraints, and under less-than optimal working conditions, increases the possibility that lock wire will not be properly installed following a probe inspection. In addition, lock wire cannot be reused, and is therefore discarded each time a probe is inspected. The residual lock wire produced in this manner can create a so-called FOD (foreign object damage) hazard to the host component if the residual wire is not properly disposed of.

The above-described problems have been apparent for many years. Thus, a long-felt need exists for a chip-detector having a probe-locking mechanism that is resistant to wear, and that allows the probe to be removed and installed with a minimal expenditure of time and labor. In addition, the locking mechanism should make it difficult to install the probe without properly securing the probe to the housing. Furthermore, a locking mechanism which provides a positive visual or tactile indication that the probe has been secured is highly desirable. Optimally, the locking mechanism provides these advantages without adding substantially to the parts count or the manufacturing complexity of the chip detector. The present invention is directed to these and other goals.

SUMMARY OF THE INVENTION

An object of the present invention is to provide a chip-detector assembly having improved probe-retention features. A presently-preferred embodiment of the chip-detector assembly comprises a housing, a probe that is capable of being coaxially coupled to the housing, and a locking mechanism. The locking mechanism comprises a plurality of elongated tangs for controlling an amount of torque required to couple the probe to the housing.

The locking mechanism preferably comprises a sleeve member and a locking ring. The sleeve member is fixedly coupled to at least one of the housing and the probe. The sleeve member has a plurality of contact surfaces disposed along a circumference of the sleeve member. The locking ring is fixedly coupled to at least one of the housing and the probe. The locking-ring tangs extend from a portion of the locking ring, and are radially spaced from a central axis of the housing. The tangs engage the sleeve-member contact surfaces when the probe is coupled to the housing.

Preferably, the tangs securely engage the sleeve-member contact surfaces when a torque about equal to or less than a predetermined amount is applied to the probe. The tangs preferably slip over the sleeve-member contact surfaces when a torque greater than the predetermined amount is applied to the probe. The probe thus remains coupled to the housing unless a torque greater than the predetermined value is applied to the probe.

A further object of the invention is to provide a chip-detector assembly having a threaded probe that is retained in a housing without the use of lock wire. In accordance with this object, a presently-preferred embodiment of the chip-detector assembly comprises a housing that includes a threaded inner surface. The chip-detector assembly also comprises a probe having a grip, and a mounting portion coupled to the grip. A plurality of threads are disposed on the probe mounting portion. The mounting portion threadably engages the housing inner surface in response to a torque applied to the grip. The probe also includes a magnetic element coupled to the mounting portion. The chip-detector assembly further comprises a locking mechanism as described above. The locking mechanism causes the probe mounting portion to remain threadably coupled to the housing inner surface unless a torque greater than a predetermined value is applied to the probe.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings:

FIG. 6 is a top view of the chip-detector assembly shown in FIGS. 1, 2, 3 and 5;

FIG. 7 is a sectional view of the area designated 7—7 in FIG. 1;

FIG. 8 is a side view of a locking-ring tang of the chip-detector assembly shown in FIGS. 1, 3, 5, and 6;

FIG. 11b is a perspective view of the embodiment shown in FIG. 11a.

DESCRIPTION OF PREFERRED EMBODIMENTS

Figure 1:
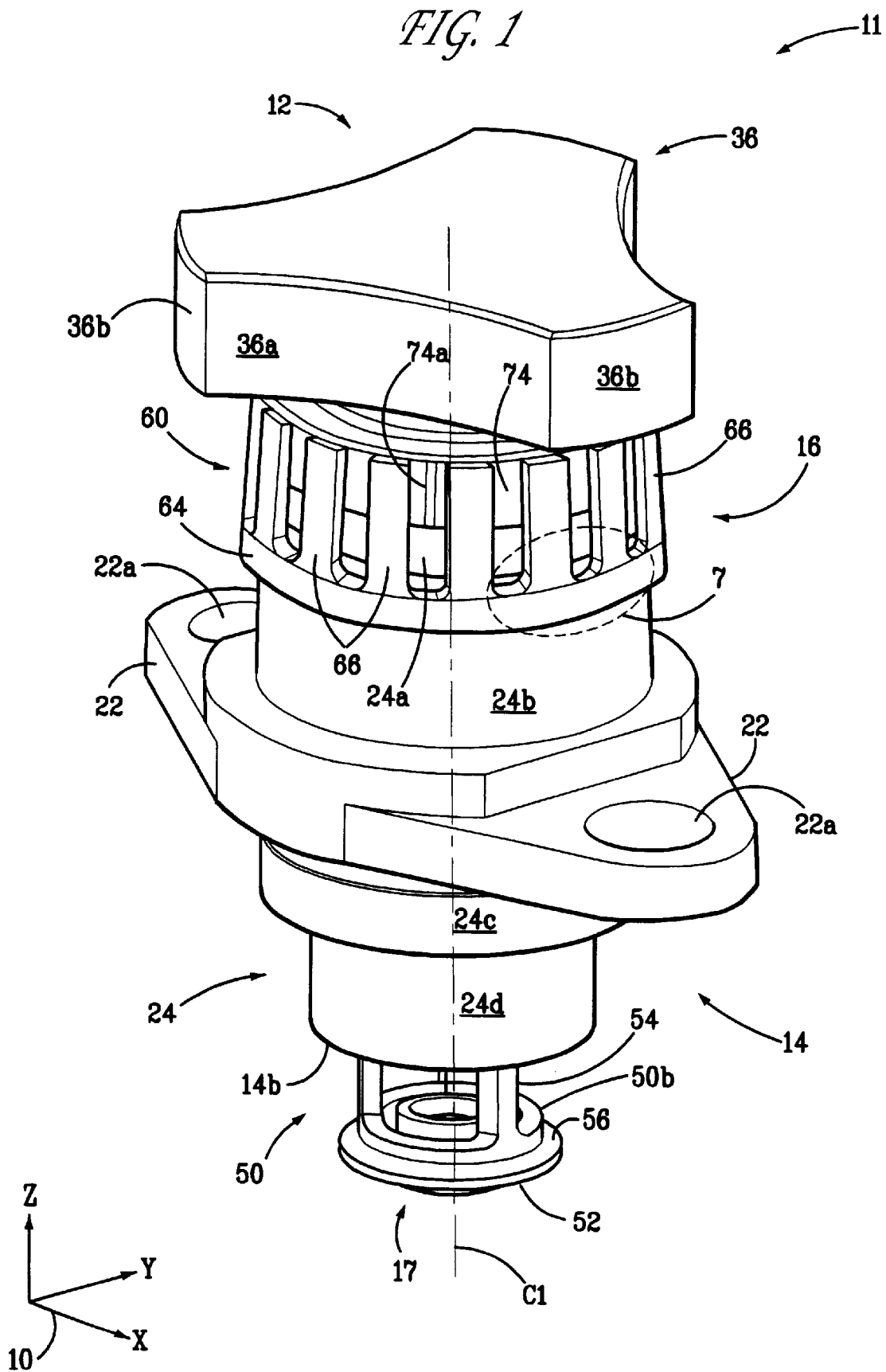
FIG. 1 is a perspective view of a chip-detector assembly in accordance with the present invention.

A presently-preferred embodiment of the invention is shown in FIGS. 1 through 8. The figures are each referenced to a common coordinate system 10 denoted in each illustration. The illustrated embodiment comprises a chip-detector assembly 11. The chip detector assembly 11 includes a probe 12 and a housing 14, as is most clearly shown in FIG. 2. The chip detector assembly 11 also includes an O-ring seal 15, a locking mechanism 16, and a self-closing valve 17. The housing 14 is mounted in a structural portion 18 that surrounds a lubricant passage 20 (see FIG. 5). The structural portion 18 and the lubricant passage 20 may be part of an engine, transmission, or other machine or mechanical component in which lubricating fluid is circulated. The machine or component in which the chip-detector assembly 11 is installed is hereinafter referred to as a "host component."

Figure 4:
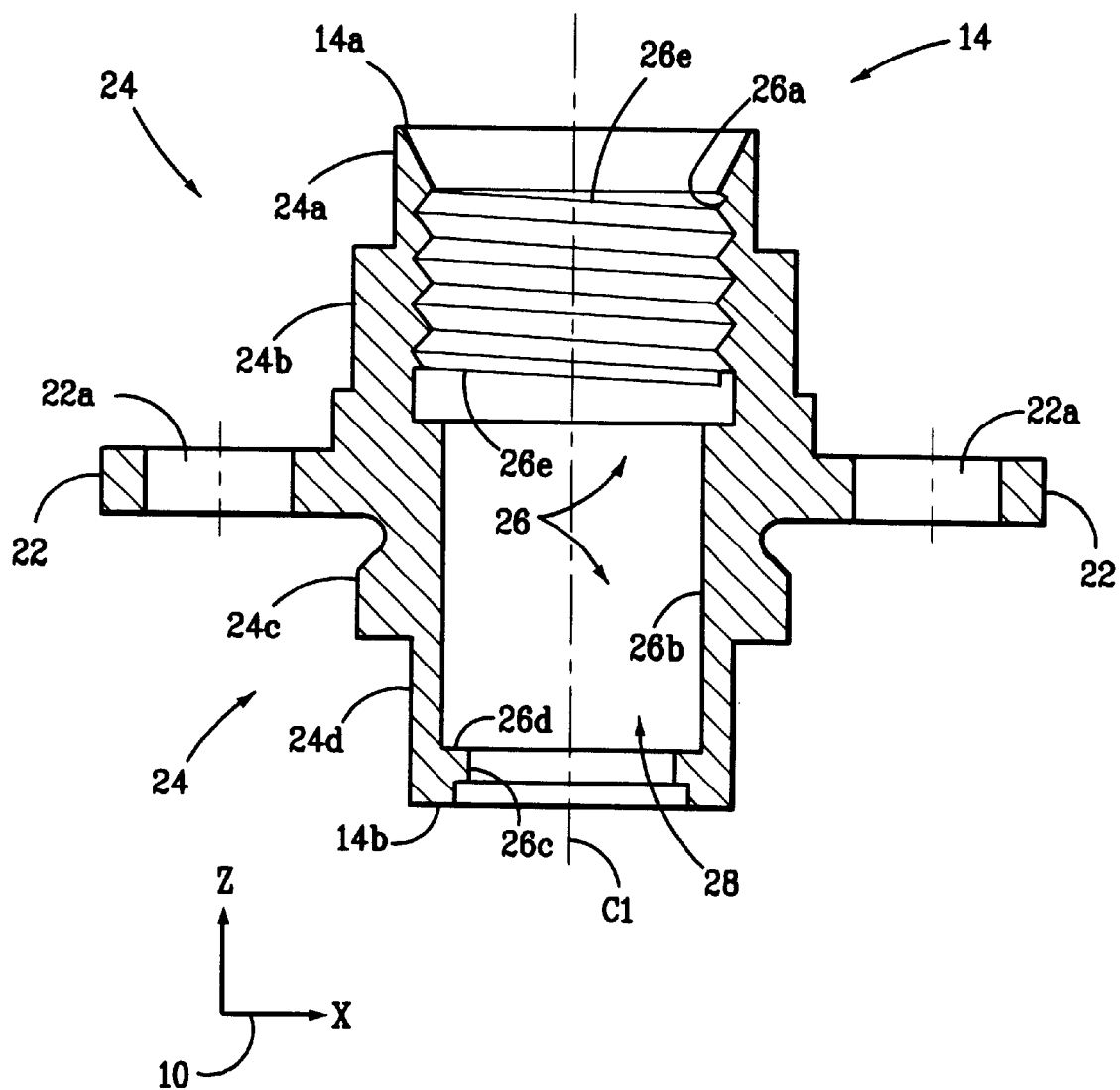
FIG. 4 is a sectional view of a housing of the chip-detector assembly shown in FIGS. 1, 2, and 3.
Figure 5:
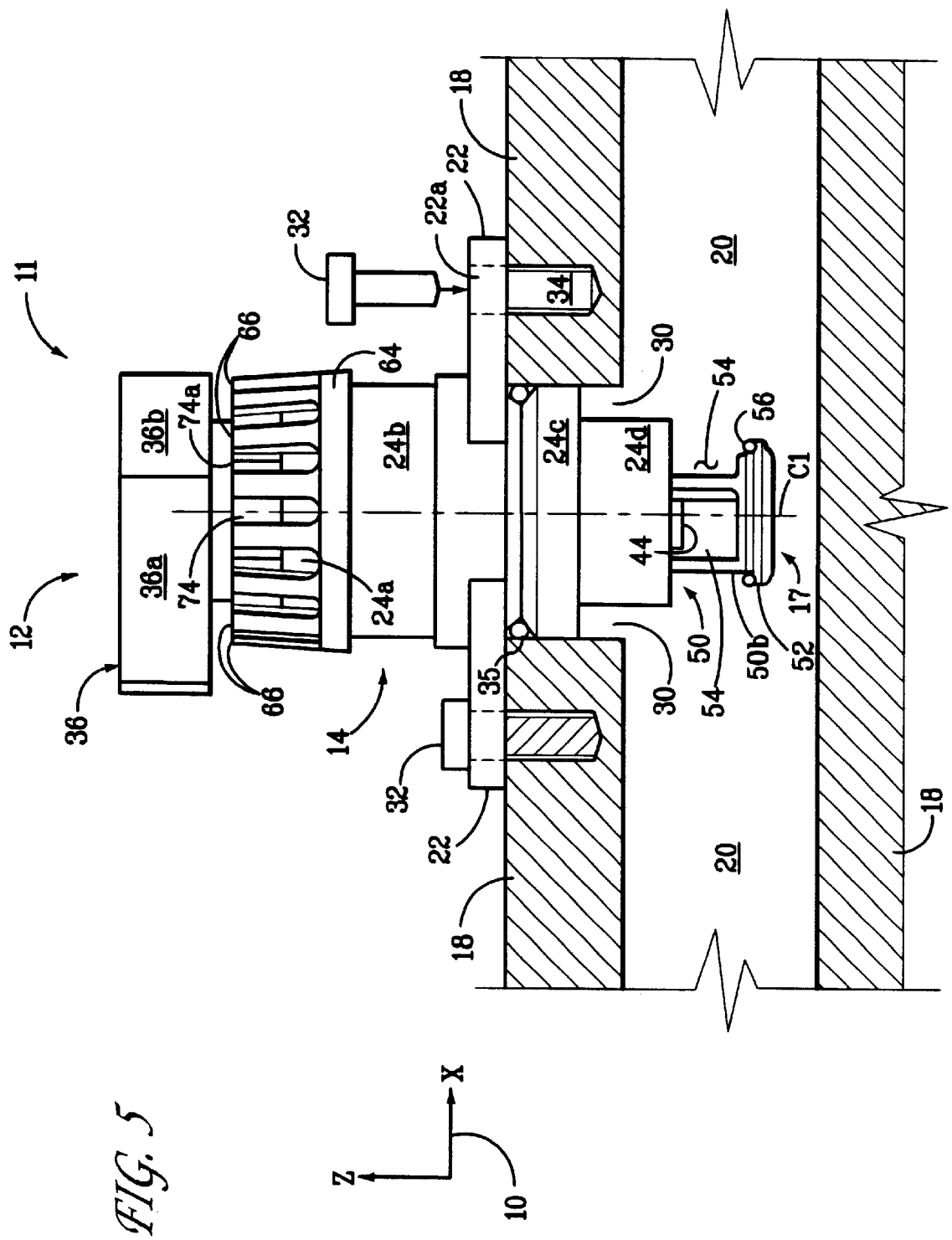
FIG. 5 is a side view of the chip-detector assembly shown in FIGS. 1, 2, and 3 installed in a host component.

The housing 14 is most clearly shown in FIG. 4. The housing 14 includes a flange 22, an outer surface 24, and an inner surface 26. The outer surface 24 has a first portion 24a and an adjacent second portion 24b. The first and second surface portions 24a and 24b are located above the flange 22. The housing outer surface 24 also includes a third portion 24c and an adjacent fourth portion 24d. The third and fourth surface portions 24c and 24d are located below the flange 22. (The terms "upper," "lower," "above," and "below," as used throughout the specification and claims, reference the component orientations depicted in the figures. These terms are used for illustrative purposes only, and are not intended to be otherwise limiting.)

The housing inner surface 26 includes an upper portion 26a, an intermediate portion 26b, and a lower portion 26c (see FIG. 4). The intermediate portion 26b has a diameter which is smaller than that of the upper portion 26a, and greater than that of the lower portion 26c. The intermediate and lower portions 26b and 26c are separated by a step 26d. The significance of these features is explained in detail below.

The upper portion 26a of the housing inner surface 26 includes a plurality of threads 26e. The threads 26e are ¾-16 UNF-3B female threads. These specifications are presented for exemplary purposes only. Threads of other types and sizes can be utilized in alternative embodiments of the invention.

The portions 26a, 26b, and 26c of the housing inner surface 26 define a center hollow 28, as is shown in FIG. 4. The hollow 28 is centered along a longitudinal centerline C1 of the housing 14, and traverses the entire length (z dimension) of the housing 14. The housing 14 also includes an upper edge 14a and a lower edge 14b.

The housing 14 is fixedly coupled to the structural portion 18 of the host component. In particular, the outer surface portions 24c and 24d are disposed within a receptacle 30 in the structural portion 18 (see FIG. 5). The flange 22 abuts the structural portion 18 when the housing 14 is so disposed. A O-ring seal 35 is disposed between the structural portion 18 and the housing 14 to inhibit leakage of lubricant from the passage 20. The housing 14 is fixed to the structural portion 18 through the use of threaded fasteners 32. The fasteners 32 are accommodated by through-holes 22a in the flange 22, and by threaded bores 34 in the structural portion 18. (Alternative embodiments of the invention may utilize a housing 14 that is fixed to the host component by way of threads disposed along the housing outer surface 24 and the circumference of the receptacle 30.) The outer surface portion 24d of the housing 14 protrudes into the lubricant passage 20 when the housing 14 is fixed to the host component in the noted manner.

Figure 2:
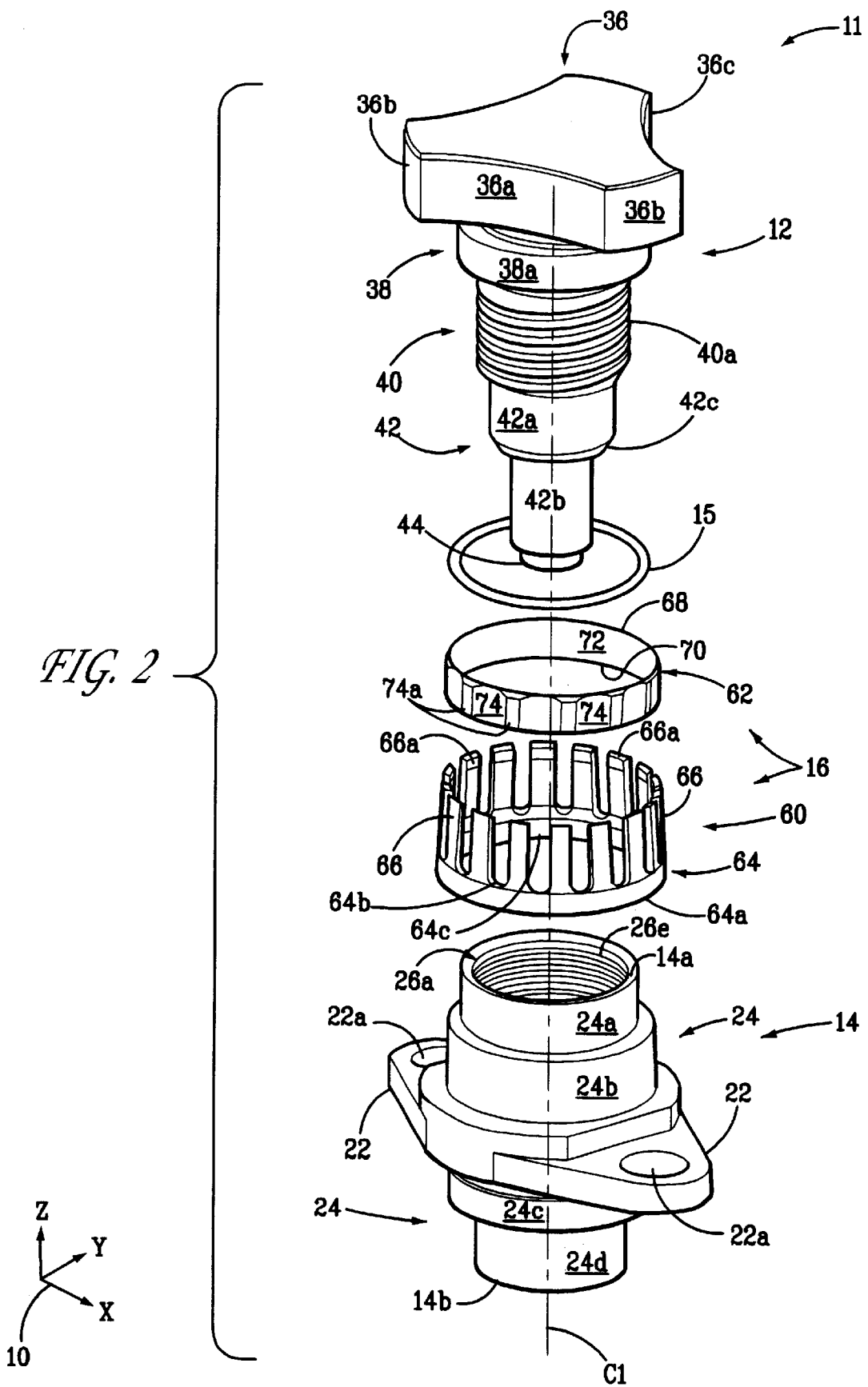
FIG. 2 is an exploded view of the chip-detector assembly shown in FIG. 1.
Figure 3:
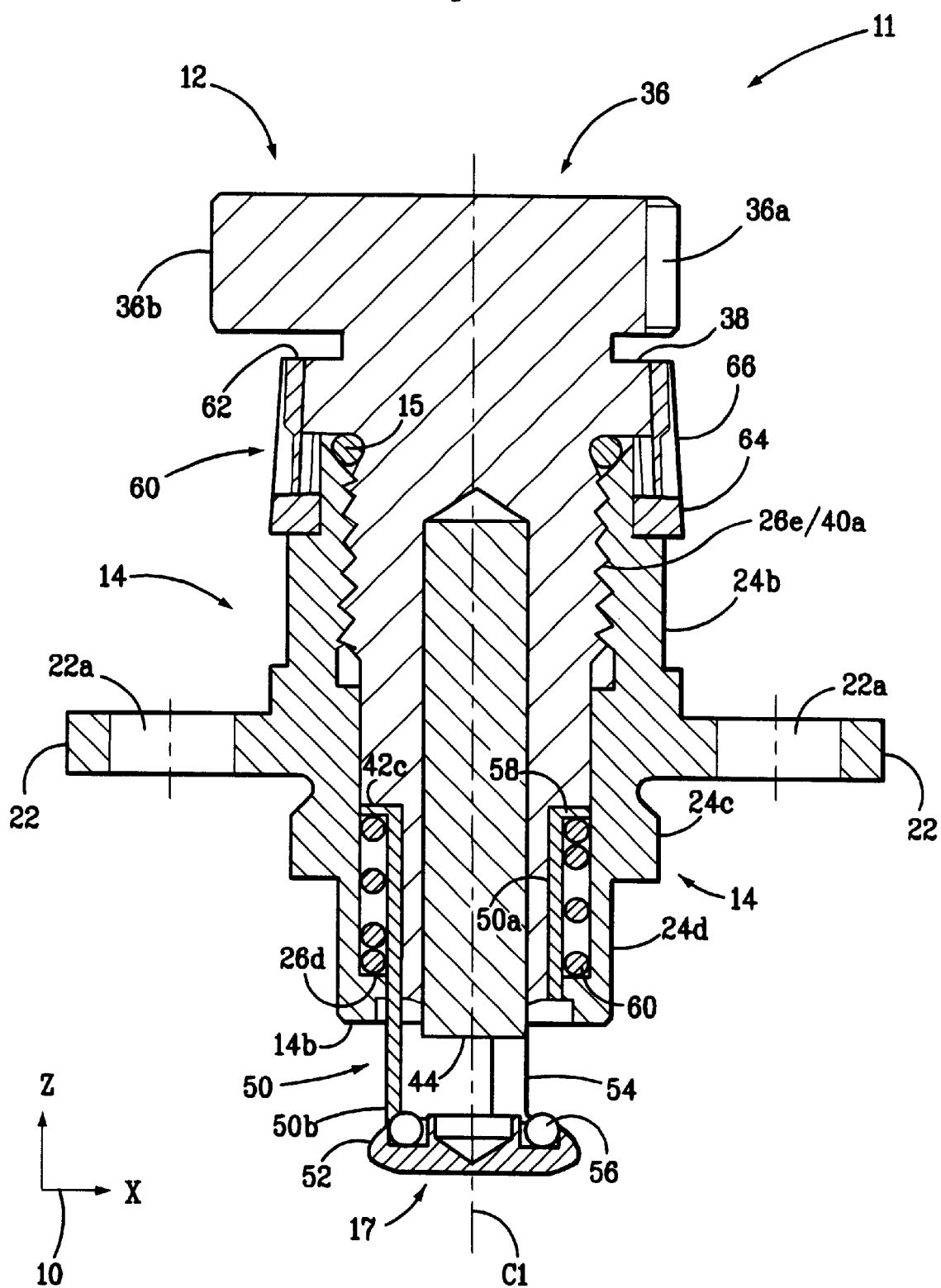
FIG. 3 is a sectional view of the chip-detector assembly shown in FIGS. 1 and 2.

The probe 12 is most clearly shown in FIGS. 2 and 3. The probe 12 comprises a grip 36, a flange 38, and a mounting portion 40. The probe 12 also includes a shaft 42 and a magnetic element 44. The flange 38 adjoins the grip 36 and the mounting portion 40. The shaft 42 adjoins the mounting portion 40. The magnetic element 44 is mounted in the shaft 42 such that a portion of the element 44 protrudes from an end of the shaft 42 (see FIG. 3). The flange 38, the shaft 42, and the magnetic element 44 each have an outer circumference that is substantially smooth and circular. The flange 38 has an outer diameter that is greater than the outer diameter of the housing upper edge 14a. The significance of this feature is discussed below.

A plurality of threads 40a are disposed along an outer circumference of the mounting portion 40 (see FIGS. 2 and 3). The pattern of the probe threads 40a matches that of the housing threads 26e, i.e., the probe threads 40a are preferably ¾-16 UNF-3A male threads. The O-ring seal 15 is disposed between the mounting portion 40 and the housing upper edge 14a when the probe 12 is installed in the housing 14. The seal 15 thereby inhibits leakage of lubricant between the probe 12 and the housing 14.

The shaft 42 includes an upper portion 42a and a lower portion 42b (see FIG. 2). The upper portion 42a has a diameter which is greater than that of the lower portion 42b. The portions 42a and 42b are separated by a step 42c. This significance of these features is explained below.

The probe 12 is coupled to the housing 14 by way of the threads 40a and 26e. The torque required to engage the threads 40a and 26e is provided manually in the exemplary embodiment, by way of the grip 36. The outer circumference of the grip 36 is contoured so as to allow the probe installer to exert an effective twisting motion on the grip 36. In particular, three elongated surfaces 36a are disposed along the outer circumference of the grip 36. Each elongated surface 36a is preferably curved inward toward its center, i.e., the surfaces 36a preferably have a substantially concave profile (see FIG. 6). The surfaces 36a are separated by three relatively short surfaces 36b. The surfaces 36b preferably have a substantially convex profile. The height (z dimension) of each surface 36a and 36b is preferably about 0.375 inches. The elongated, concave profile of the surfaces 36a makes it easier for the probe installer to effectively grasp the grip 36 and thereby exert the torque required to engage the threads 40a and 26e.

The probe 12 is coupled to the housing 14 by inserting the probe 12 into the housing center hollow 28. In particular, the magnetic element 44 and the shaft 42 are inserted into the hollow 28 until the probe threads 40a contact the housing threads 26e. The probe 12 is subsequently rotated by way of the grip 36, thereby causing the threads 40a and 26e to engage. Continued rotation of the probe 12 eventually causes the probe flange 38 to contact the upper edge 14a of the housing 14, thereby preventing further rotation of the probe 12.

The self-closing valve 17 is most clearly shown in FIG. 3. The self-closing valve 17 inhibits leakage of lubricant from the passage 20 when the probe 12 is not installed in the housing 14. The valve 17 comprises a cylindrical portion 50 having an upper end 50a and a lower end 50b. The valve 17 also includes a stop 52 fixed to the lower end 50b. The cylindrical portion 50 is slidably disposed within the center hollow 28 of the housing 14. The cylindrical portion 50 has an outer diameter approximately equal to the diameter of the lower portion 26c of the housing inner surface 26. A plurality of penetrations 54 are formed in the cylindrical portion 50 proximate the lower end 50b. An O-ring seal 56 is disposed around an outer circumference of the cylindrical portion 50, between the penetrations 54 and the stop 52.

A lip 58 is integrally formed around the upper end 50a of the cylindrical portion 50 (see FIG. 3). The lip 58 has an outer diameter approximately equal to the diameter of the intermediate portion 26b of the housing inner surface 26. A spring 60 is positioned around the outer circumference of the cylindrical portion 50, between the lip 58 and the step 26d of the housing inner surface 26. Opposing ends of the spring 60 abut the lip 58 and the step 26d. The spring 60 thus biases the cylindrical portion 50 upward, i.e., away from the lubricant passage 20. The spring bias causes the stop 52 to abut the lower edge 14b of the housing 14 when the probe 12 is not installed in the housing 14. Hence, the penetrations 54 are positioned within the hollow 28, and the O-ring seal 56 engages the lower portion 26c of the housing inner surface 26 when the probe 12 is not installed. These features inhibit leakage of lubricant from the passage 20 when the probe 12 is removed for inspection.

Insertion of the probe 12 into the housing 14 causes the step 42c of the probe shaft 42 to abut the lip 58 of the cylindrical portion 50, as shown in FIG. 3. Continued insertion of the probe 12 thus forces the valve 17 downward, i.e., toward the lubricant passage 20. This movement drives the penetrations 54 into the passage 20. The probe shaft 42 is dimensioned so as to cause the magnetic element 44 to protrude into the lubricant passage 20 when the probe 12 is fully inserted in the housing 14 (see FIG. 5). More particularly, the magnetic element 44 is disposed proximate the penetrations 54 of the cylindrical portion 50 when the probe 12 is fully inserted. Hence, the magnetic element 44 is exposed to the lubricant stream within the passage 20 by way of the penetrations 54. This arrangement allows the magnetic element 44 to attract and retain wear debris suspended in the lubricant stream.

Structural details concerning the locking mechanism 16 are as follows. The locking mechanism 16 comprises a locking ring 60 and a sleeve member 62 (see FIG. 2). The locking ring 60 is fixedly coupled to the housing 14, and the sleeve member 62 is fixedly coupled to the probe 12. The locking ring 60 and the sleeve member 62 engage each other as the probe 12 is rotatably inserted into the housing 14 in the above-described manner. The engagement of the locking ring 60 and the sleeve member 62 secures the probe 12 in the housing 14, and thereby inhibits any loosening of the probe 12 from the housing 14 once the probe 12 has been installed. The manner in which the locking mechanism 16 performs this function is described in detail below.

The locking ring 60 includes a circumferential portion 64 having a first edge 64a, an opposing second edge 64b, and an inner circumferential surface 64c (see FIG. 2). The locking ring 60 also includes a plurality of elongated tangs 66. Each tang 66 adjoins the edge 64b of the circumferential portion 64. Preferably, the circumferential portion 64 and the tangs 66 are unitarily formed. The tangs 66 are preferably formed from a hard, durable, and strong material. For example, the tangs 66 of the exemplary embodiment are formed from Inconel alloy, a product of Inco., Inc. (The International Nickel Company).

The longitudinal axis of each tang 66 is substantially perpendicular to the edge 64b, and the spacing between adjacent tangs 66 is about equal in the exemplary embodiment. Alternatively, the longitudinal axis of each tang 66 may be oblique to the edge 64b. Furthermore, the tangs 66 may be spaced apart in unequal intervals in alternative embodiments of the locking ring 60. This feature can be utilized to ensure that the prevailing torque for the probe 12, i.e., the torque-level needed to loosen and tighten the probe 12, is substantially constant as the probe is installed in and removed from the housing 14.

Each tang 66 includes a knob 66a (see FIG. 8). The knob 66a protrudes from an inner surface 66b of the tang 66, proximate an end 66c of the tang. Hence, each knob 66a projects radially inward from the corresponding surface 66b. The significance of the knobs 66a is explained below. Embodiments that do not incorporate knobs such as the knobs 66a also within the contemplated scope of the invention, i.e., the tang surfaces 66b may, in the alternative, be substantially flat. A total of sixteen tangs are utilized on the exemplary locking ring 60.

The locking ring 60 is fixedly coupled to the housing 14, as noted previously. Specifically, the inner circumferential surface 64c of the circumferential portion 64 is fixed to the outer surface portion 24a of the housing 14. The locking ring 60 is preferably pressed onto the surface 24a. Alternative methods of fixing the locking ring 60 to the housing 14 may be also utilized. Coupling the locking ring 60 to the housing 14 in the noted manner causes the tangs 66 to be spaced apart from, and substantially parallel to, the longitudinal centerline Cl of the housing 14.

The sleeve member 62 has an upper surface 68 and an opposing lower surface 70 (see FIG. 2). The sleeve member 62 also includes a substantially circular inner circumferential surface 72. The sleeve member 62 further comprises a plurality of contact surfaces 74. The contact surfaces 74 form an outer circumference of the sleeve member 62. Each contact surface 74 has a substantially concave shape in the exemplary embodiment. The surfaces 74 each form a detent 78, as is most clearly shown in FIG. 7 (the curvature and depth of the detents 78 is exaggerated in FIG. 7 for illustrative purposes). The surfaces 74 are separated by peak-shaped junctures 74a. These features give the outer circumference of the sleeve member 62 a scalloped geometry. Contact surfaces 74 having other shapes, e.g., flat, are also within the contemplated scope of the invention. The number of contact surfaces 74 disposed along the sleeve member 62 is preferably equal to the number of tangs 66 on the locking ring 60.

The sleeve member 62 is fixedly coupled to the probe 12, as previously noted. Specifically, the inner circumferential surface 72 of the sleeve member 62 is fixedly coupled to an outer circumferential surface 38a of the probe flange 38. Hence, rotation of the probe 12 imparts a corresponding rotational movement to the sleeve member 62. The sleeve member 62 may be coupled to the flange 38 by, for example, an interference fit between the surfaces 72 and 38a. Alternatively, the sleeve member 62 and the flange 38 may be unitarily formed.

Functional details of the locking mechanism 16 are as follows. The tangs 66 engage the sleeve member 62 as the probe 12 is rotatably inserted into the housing 14 in the above-described manner. In particular, the engagement of the probe threads 40a and the housing threads 26e drives the tang knobs 66a into contact with the sleeve member contact surfaces 74. The relative dimensions of the locking ring 60 and the sleeve member 62 are chosen so as to produce an interference fit between the tang knobs 66a and the contact surfaces 74. In the exemplary embodiment, the interference between each knob 66a and surface 74 is about 0.010 inches when the knob 66a is positioned at the approximate center of the contact surface 74, i.e., each knob 66a is displaced radially outward by about 0.010 inches when the knob 66b contacts the surface 74 as shown in FIG. 7.

The interference between the tang knobs 66a and the contact surfaces 74 causes the relatively thin tangs 66 to flex radially outward, i.e., away from the centerline C1, as the knobs 66a contact the sleeve member 72. The resilience of the tangs 66 produces a contact force between each knob 66a and surface 74 in response to this flexing. Continued rotation of the probe 12 requires an increase in the torque applied to the grip 36 by the probe installer. This increase is necessary to overcome the resistance of the tangs 66 to the noted flexing. The increased torque is also needed to overcome the frictional forces generated between the tang knobs 66a and the contact surfaces 74.

Continued rotation of the probe 12 after the knobs 66a and the contact surfaces 74 have engaged causes the tang knobs 66a to slip over the contact surfaces 74. In addition, the knobs 66a pass over the junctures 74a between adjoining surfaces 74. The peak-like geometry of the junctures 74a causes the tangs 66 to move over the junctures 74a with a ratcheting motion. The dimensions of the tangs 66 and the sleeve member 62 are chosen such that the stresses within the tangs 66 remain within the elastic limit as the tangs 66 flex as noted. This provision ensures that the contact force between the tangs 66 and the contact surfaces 74 remains substantially constant throughout the life of the chip-detector assembly 11.

The knobs 66a continue to slip and ratchet over the surfaces 74 and the junctures 74a until the threads 40a and 26e have fully engaged, i.e., until the probe 12 has reached the end of its travel within the housing 14. The locking ring 60 and the sleeve member 62 are aligned so that each knob 66a is substantially centered in a corresponding detent 78 when the threads 40a and 26e are fully engaged (see FIG. 7). (This feature is not present in alternative embodiments that utilize an unequal spacing interval for the tangs 66.)

The locking ring 60 and the sleeve member 62 secure the probe 12 to the housing 14 when the probe 12 is installed in the housing 14. Specifically, the engagement of the tangs 66 and the contact surfaces 74 inhibits the probe 14 from rotating and thereby disengaging from the housing 14. This function arises primarily from the resilience of the tangs 66. In particular, the characteristic shape of the contact surfaces 74 requires that each tang 66 flex outwardly in order to move from its position in the center of a corresponding detent 78 (see FIG. 7). The resilience of the tangs 66 generates a resistance to this outward flexing. In addition, friction caused by the contact force between the tang knobs 66a and the contact surfaces 74 exerts further resistance to relative movement between the knobs 66b and the surfaces 74. Thus, the tang knobs 66 bias the probe 14 against rotational movement by way of the sleeve member 62.

The tangs 66 tightly engage the sleeve member 62, and the probe threads 40a tightly engage the housing threads 26e until a torque greater than a particular value is applied to the probe 12. This torque value is hereinafter referred to as the "breakaway torque" of the probe 12. Hence, a torque equal to or greater than the breakaway torque must be applied to the probe 12 in order to loosen the probe 12 once the probe 12 has been installed and tightened to a predetermined torque value. The breakaway torque is a function of the frictional forces between the threads 40a and 26e, and the anti-rotational bias exerted by the tangs 66 on the probe 12.

The breakaway torque can be tailored to a desired value by manipulating the design parameters of the locking ring 60 and the sleeve member 62. Preferably, the breakaway torque is set at a value high enough to prevent the probe 12 from loosening unintentionally due to factors such as high vibration levels. The breakaway torque should be low enough, however, to allow the probe 12 to be intentionally removed from the housing 14 without a need to apply excessive torque to the grip 36.

The breakaway torque is a function of the anti-rotational bias exerted by the tangs 66 on the sleeve member 62, as noted previously. This bias, in turn, is a function of the resilience, i.e., the effective spring constant, of the tangs 66. The anti-rotational bias is also a function of the amount of interference between the tangs 66 and the contact surfaces 74.

The effective spring constant of the tangs 66 is dependent upon the dimensions of the tangs 66. The effective spring constant is also a function of the stiffness of the material from which the tangs 66 are formed. Hence, the breakaway torque for the probe 12 can be set at a desired value by manipulating the length (longitudinal dimension), width (circumferential dimension), and thickness (radial dimension) of the tangs 66. The breakaway torque can also be manipulated by manufacturing the tangs 66 from a material having a particular elastic modulus. Furthermore, the breakaway torque can be tailored to a particular value by sizing the locking ring 60 and the sleeve member 62 so as to produce a particular level of interference between the tangs 66 and the contact surfaces 74.

For example, the length, width, and thickness of the tangs 66 are about 0.600, 0.115, and 0.040 inches, respectively. The tangs 66 are manufactured from Inconel alloy having an elastic modulus of about $30 \times 10^6$ pounds per square inch. Furthermore, the interference between the tangs 66 and the contact surfaces 74 is about 0.010 inches, as noted above. These parameters, in conjunction with the previously-noted specifications for the threads 40a and 26e, produce a breakaway torque of about 30 inch-lbs. in the exemplary embodiment.

The invention provides numerous advantages in relation to commonly-used chip detectors. For example, the threaded mating configuration of the probe 12 and the housing 14 prevents substantially all relative movement between the probe 12 and the housing 14 when the probe 12 is fully inserted in the housing 14. This characteristic enhances the durability and the useful life of the chip-detector assembly 11. In addition, the threaded mating configuration forms a tortuous leak path for the lubricating fluid, thereby eliminating the need for a back-up seal to augment the O-ring seal 15. These features represent substantial improvements over quick-disconnect-type chip detectors. Quick-disconnect-type chip detectors, as noted previously, usually experience wear due to relative movement between the locking pins and slots commonly used in such detectors. Furthermore, quick-disconnect-type chip detectors typically require multiple seals to prevent leakage of lubricant through the relatively simple leak paths inherent in such chip detectors.

The use of the locking mechanism 16 furnishes positive retention of the probe 12 without the use of lock wire. This feature represent a substantial advantage in relation to common chip detectors that utilize a threaded mating configuration. Threaded chip detectors typically require lock wire to adequately secure the probe to the housing, as noted previously. Eliminating the need for lock wire simplifies removal and reinstallation of the probe 12 in the chip-detector assembly 11. Hence, the probe 12 can be removed and reinstalled more quickly and easily than a common threaded probe. This feature is particularly advantageous in aircraft applications where, as previously noted, probe inspections must often be performed outside, under adverse weather conditions, and within strict time constraints.

Furthermore, the use of the locking mechanism 16 substantially eliminates the possibility that the probe 12 will be installed in the housing 14 without being properly secured. Specifically, lock wire must be replaced each time a lock-wired probe is removed and reinstalled. This requirement raises the possibility that the probe may be installed without being wired. Also, lock wire can be installed in an improper manner.

The locking mechanism 16, by contrast, is an integral, non-removable part of the chip-detector assembly 11. In particular, installation of the probe 12 in the housing 14 is, by itself, sufficient to engage the locking ring 60 and the sleeve member 62, thereby locking the probe 12 in place. Hence, the probe 12 is automatically secured to the housing 14 with no action on the part of the installer other than rotatably inserting the probe 12 into the housing 14. This feature substantially reduces the possibility that the probe 12 can be installed in the housing 14 without being properly secured. In addition, the integral nature of the locking mechanism 16 allows the probe 12 to be removed and reinstalled without the production of residual material, e.g., used lock wire. Hence, the locking mechanism 16 substantially reduces the potential for FOD-related damage to the host component in comparison to lock-wired probes.

Furthermore, the locking ring 60 and the sleeve member 62 are visible to the probe installer, and thus provide a positive visual indication that the probe 12 has been secured to the housing 14. Also, the ratcheting motion of the tangs 66 over the junctures 74a provides a tactile indication that the probe 12 and the housing 14 are securely mated.

Further advantages of the present invention arise from the relative simplicity of the locking mechanism 16. For example, the locking mechanism 16 is formed from thin, compact components. Hence, the chip-detector assembly 11 is relatively compact. In particular, the chip-detector assembly 11 occupies a minimal amount of space above the host component. This feature is particularly advantageous in aircraft applications, where mechanical components are typically subject to strict spatial constraints.

Furthermore, the locking mechanism 16 has a minimal parts count, and does not rely on complicated mechanical interactions between its component parts. In addition, the components of the locking mechanism 16 can be formed through relatively simple machining operations, and can be assembled without the use of fasteners. Hence, the locking mechanism 16 can be fabricated at a relatively low cost, adds minimally to the overall parts count, weight, and dimensions of the chip-detector assembly 11, and has a minimal potential for malfunction.

In addition to the above-noted advantages, the individual components of the locking mechanism 16 are fairly robust, thus making the chip-detector assembly 11 particularly suitable for use with machinery that produces high vibration levels. Also, the components of the locking mechanism 16 can be fabricated from materials that are suitable for use in high-temperature or corrosive environments. Furthermore, the locking mechanism 16 may easily be inspected for wear and other damage that can make the locking mechanism 16 unsuitable for continued service.

Furthermore, the locking mechanism 16 is substantially impervious to the build-up of contaminants such as grease and other lubricating materials. Specifically, the sliding motion of the tang knobs 66a over the surfaces 74 produces a wiping effect that removes contaminants from the contact area between the knobs 66a and the surfaces 74. This feature represents an advantage in relation to quick-disconnect-type chip detectors. In particular, the presence of contaminant deposits on a quick-disconnect-type detector can reduce the contact area between the pins and slots of the detector, thereby altering the detector's locking characteristics.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed. For example, the locations of the locking ring 60 and the sleeve member 62 can be reversed in comparison to the exemplary embodiment, i.e., the locking ring 60 may be fixed to the probe 12, and the sleeve member 62 may be fixed to the housing 14.

Figure 9:
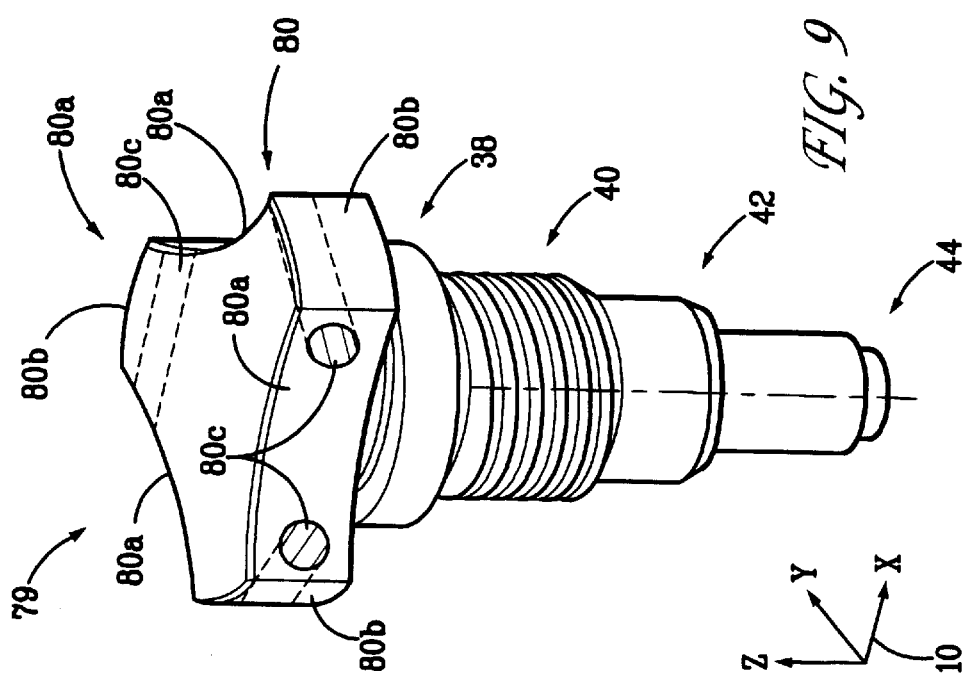
FIG. 9 is a perspective view of a first alternative embodiment of a probe for use with the chip-detector assembly shown in FIGS. 1, 2, 3, 5, and 6.

Furthermore, numerous variations in the configuration of the grip 36 are possible. For example, FIG. 9 shows a probe 79 having a grip 80. The grip 80 includes provisions that increase the amount of torque that can be applied to the grip 80 by the probe installer. The grip 80 includes three elongated concave surfaces 80a and three adjoining surfaces 80b. The surfaces 80a and 80b are substantially identical to the surfaces 36a and 36b, respectively, of the grip 36, with the following exception. Through holes 80c are bored through the surfaces 80a proximate the surfaces 80b, as shown in the FIG. 9. (The probe 79 is otherwise identical to the probe 12.)

The through holes 80c allow a rigid, elongated member, e.g., a screwdriver or a drive punch (not shown), to be temporarily coupled to the grip 80. Installation and removal torque can be applied to the grip 80 through the elongated member. The elongated member acts as a torque lever, thereby increasing the amount of torque that can be exerted on the grip 80 by the installer.

Figure 10:
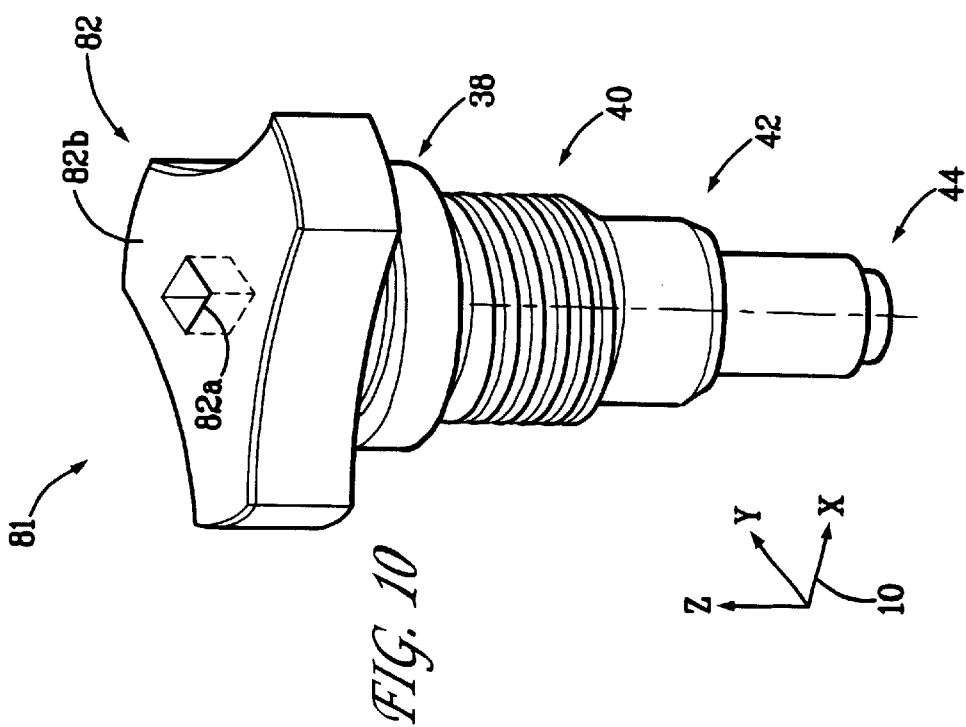
FIG. 10 is a perspective view of a second alternative embodiment of a probe for use with the chip-detector assembly shown in FIGS. 1, 2, 3, 5, and 6.

Another potential variant of the grip 36 is illustrated in FIG. 10. FIG. 10 shows a probe 81 having a grip 82. A receptacle 82a disposed in an upper surface 82b of the grip 82. (The probe 81 is otherwise identical to the probe 12.) The receptacle 82a accommodates a wrenching device (not shown). The wrenching device can be used to apply installation or removal torque to the grip 82 in addition to, or in lieu of, manually-applied torque. The receptacle 82a may be square, so as to accommodate a standard ratchet. Alternatively, the receptacle 82a can be hexagonally-shaped, thus facilitating the use of an allen key.

Figure 11A:
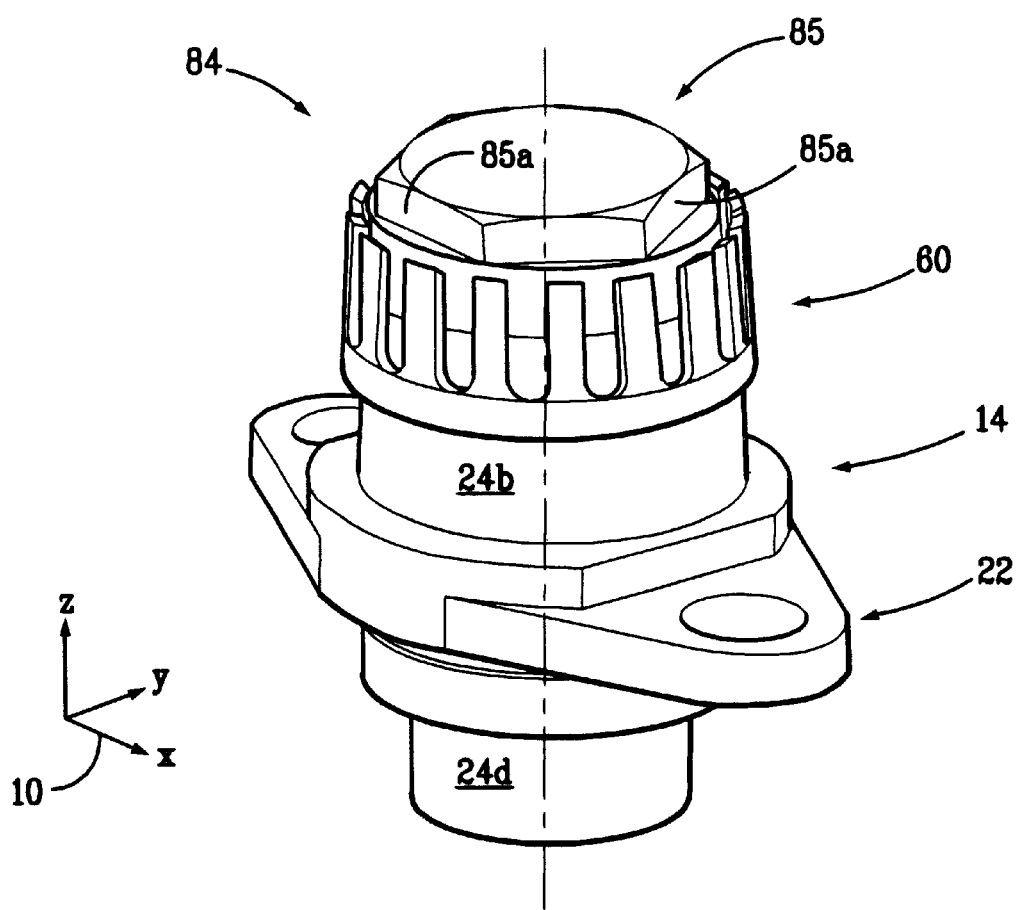
FIG. 11a is a perspective view of an alternative embodiment of the chip-detector assembly shown in FIGS. 1, 2, 3, 5, and 6.
Figure 11B:
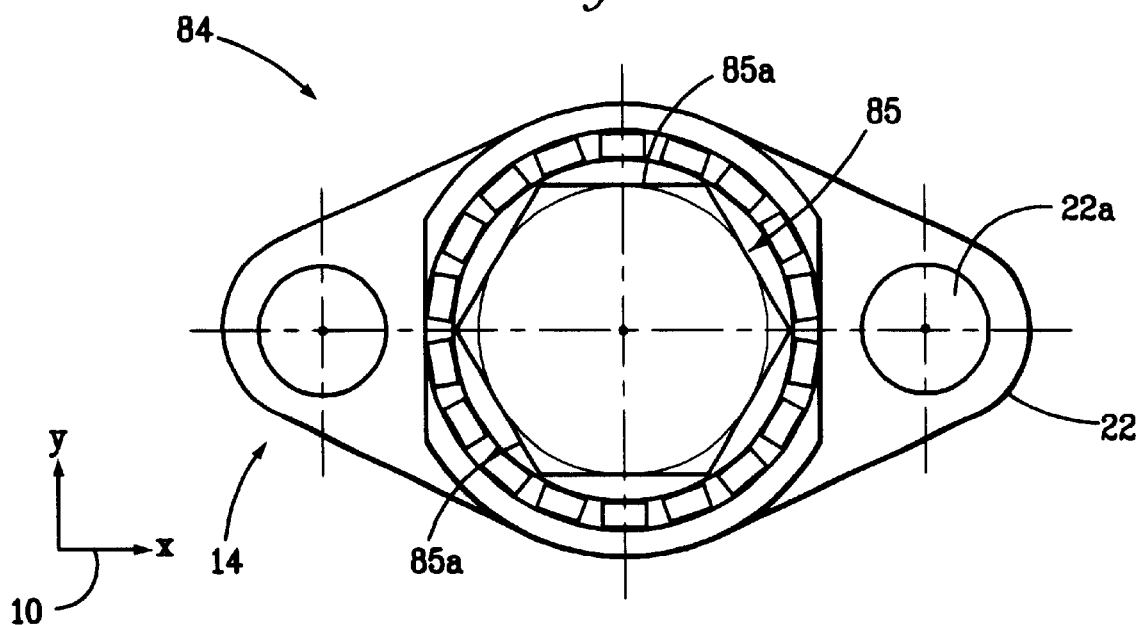

Furthermore, an entire grip may be formed in a shape suitable for interfacing with a wrenching device such as a socket or a wrench, as shown in FIGS. 11a and 11b. FIGS. 11a and 11b illustrate a chip-detector assembly 84 having a grip 85. The grip 85 includes six flats 85a. The flats 85a are disposed in a hexagonal arrangement, thereby allowing a wrench or a socket to be coupled to the grip 85. (The chip-detector assembly 84 is otherwise identical to the chip-detector assembly 11.)

What is claimed is:

1. A chip-detector assembly, comprising:
   a housing comprising a flange for securing the housing to a host component;
   a probe that is capable of being coaxially coupled to the housing by a torque, comprising a grip, a shaft fixedly coupled to the grip, and a permanent magnetic element fixedly coupled to the shaft for attracting and retaining magnetizable particles and chips; and
   a locking mechanism for controlling an amount of torque required to couple the probe to the housing, comprising a sleeve member, a locking ring, and a plurality of elongated tangs, wherein: (i) the sleeve member is fixedly coupled to one of the housing and the probe; (ii) the sleeve member has a plurality of contact surfaces disposed along a circumference of the sleeve member; (iii) the locking ring is fixedly coupled to the other of the housing and the probe; and (iv) the plurality of elongated tangs extend from a portion of the locking ring, are radially spaced from a central axis of the housing, and engage the sleeve-member contact surfaces when the probes coupled to the housing.

2. The chip-detector assembly of claim 1, wherein the tangs securely engage the sleeve-member contact surfaces when a torque about equal to or less than a predetermined amount is applied to the probe, and the tangs slip over the sleeve-member contact surfaces when a torque greater than the predetermined amount is applied to the probe, whereby the probe remains coupled to the housing unless a torque greater than the predetermined amount is applied to the probe.

3. The chip-detector assembly of claim 1, wherein the grip includes a plurality of elongated and substantially concave surfaces disposed along an outer circumference of the grip.

4. The chip-detector assembly of claim 3, wherein the grip further includes a plurality of substantially convex surfaces disposed between the substantially concave surfaces.

5. The chip-detector assembly of claim 4, wherein the grip includes three of the substantially concave surfaces and three of the substantially convex surfaces.

6. The chip-detector assembly of claim 4, wherein a through hole is defined in the grip between a first and a second of the substantially concave surfaces.

7. The chip-detector assembly of claim 1, wherein a receptacle is defined in the grip proximate a top surface of the grip, the receptacle being adapted to receive a wrenching device.

8. The chip-detector assembly of claim 1, wherein the grip includes a plurality of flats disposed in a hexagonal arrangement.

9. The chip-detector assembly of claim 2, wherein the tangs flex radially and ratchet over junctures between the sleeve-member contact surfaces when the torque about equal to or greater than the predetermined amount is applied to the probe.

10. The chip-detector assembly of claim 9, wherein the junctures between the sleeve-member contact surfaces are peak-shaped.

11. The chip-detector assembly of claim 1, wherein the sleeve-member contact surfaces are disposed along an outer circumference of the sleeve member.

12. The chip-detector assembly of claim 1, wherein the sleeve-member contact surfaces have a substantially concave shape.

13. The chip-detector assembly of claim 1, wherein each of the tangs includes a knob that projects radially from a surface of the tang.

14. The chip-detector assembly of claim 1, wherein the tangs are substantially parallel to a central axis of the housing.

15. The chip-detector assembly of claim 1, wherein the sleeve member is fixedly coupled to the probe and the locking ring is fixedly coupled to the housing.

16. The chip-detector assembly of claim 15, wherein the probe includes a flange disposed between the grip and the shaft, the sleeve member being fixedly coupled to the flange.

17. The chip-detector assembly of claim 15, wherein the locking ring is fixed to an outer surface of the housing.

18. The chip-detector assembly of claim 1, wherein the probe is threadably coupled to the housing.

19. The chip-detector assembly of claim 1, further comprising a self-closing valve slidably coupled to the housing.

20. The chip-detector assembly of claim 1, wherein the locking-ring tangs are equally spaced around a circumference of the locking ring.

21. A chip-detector assembly, comprising:

a housing having a threaded inner surface, a probe having a (i) grip, (ii) a mounting portion fixedly coupled to the grip and having a plurality of threads, the mounting portion being adapted to threadably engage the housing inner surface in response to a torque applied to the grip, and (iii) a permanent magnetic element fixedly coupled to the mounting portion for attracting and retaining magnetizable particles and chips; and a locking mechanism comprising a locking ring and a sleeve member, wherein (i) the sleeve member is fixedly coupled to one of the housing and the probe, (ii) the sleeve member has a plurality of contact surfaces disposed along a circumference of the sleeve member, (iii) the locking ring is fixedly coupled to the other of the housing and the probe, and (iv) the locking ring has a plurality of elongated tangs extending from a portion of the locking ring and being radially spaced from a central axis of the housing, the tangs engaging the sleeve-member contact surfaces when the probe mounting portion threadably engages the housing inner surface.

22. The chip-detector assembly of claim 21, wherein the grip includes a plurality of elongated and substantially concave surfaces disposed along an outer circumference of the grip.

23. The chip-detector assembly of claim 22, wherein the grip further includes a plurality of substantially convex surfaces disposed between the substantially concave surfaces.

24. The chip-detector assembly of claim 23, wherein the grip includes three of the substantially concave surfaces and three of the substantially convex surfaces.

25. The chip-detector assembly of claim 21, wherein the tangs securely engage the sleeve-member contact surfaces when a torque about equal to or less than a predetermined amount is applied to the grip, and the tangs slip over the sleeve-member contact surfaces when a torque greater than the predetermined amount is applied to the grip, whereby the probe mounting portion remains threadably coupled to the housing inner surface unless a torque greater than the predetermined amount is applied to the grip.

26. The chip-detector assembly of claim 21, wherein the locking ring is fixedly coupled to the housing and the sleeve member is fixedly coupled to the probe.

27. The chip-detector assembly of claim 21, further comprising a self-closing valve slidably coupled to the housing.

28. The chip-detector assembly of claim 21, wherein the probe further comprises a shaft coupled to the mounting portion, the magnetic element being mounted on the shaft.

\* \* \* \* \*